United States Patent [19]

Waehner

[11] 4,088,928
[45] May 9, 1978

[54] REGULATED CRT POWER SUPPLY

[75] Inventor: Glenn Carl Waehner, Riverside, Conn.

[73] Assignee: United Technologies Corporation, Hartford, Conn.

[21] Appl. No.: 754,801

[22] Filed: Dec. 27, 1976

[51] Int. Cl.² .......................... H04N 3/18; G05F 1/46
[52] U.S. Cl. ..................................... 315/307; 307/44; 315/411; 323/22 T; 358/190
[58] Field of Search ............... 315/291, 307, 311, 411; 323/22 T, 43; 307/44; 358/190

[56] References Cited

U.S. PATENT DOCUMENTS

| | | | |
|---|---|---|---|
| 3,519,741 | 7/1970 | Knight | 358/190 |
| 3,585,299 | 6/1971 | Boekhorst | 358/190 |
| 3,598,909 | 8/1971 | Sasaki et al. | 358/190 |
| 3,886,438 | 5/1975 | Bouman | 323/22 T |

Primary Examiner—Eugene R. LaRoche
Attorney, Agent, or Firm—Richard P. Lange

[57] ABSTRACT

A regulated power supply for a CRT has an amplifier connected to the output of the high voltage power supply for sensing variations in the operating potential supplied to the CRT anode. The amplifier allows a double acting response to voltage fluctuations in this high voltage operating level supplied to the CRT anode which causes a directly adding voltage to feedback from the intermediate voltage power supply and also unloads the intermediate voltage power supply.

7 Claims, 1 Drawing Figure

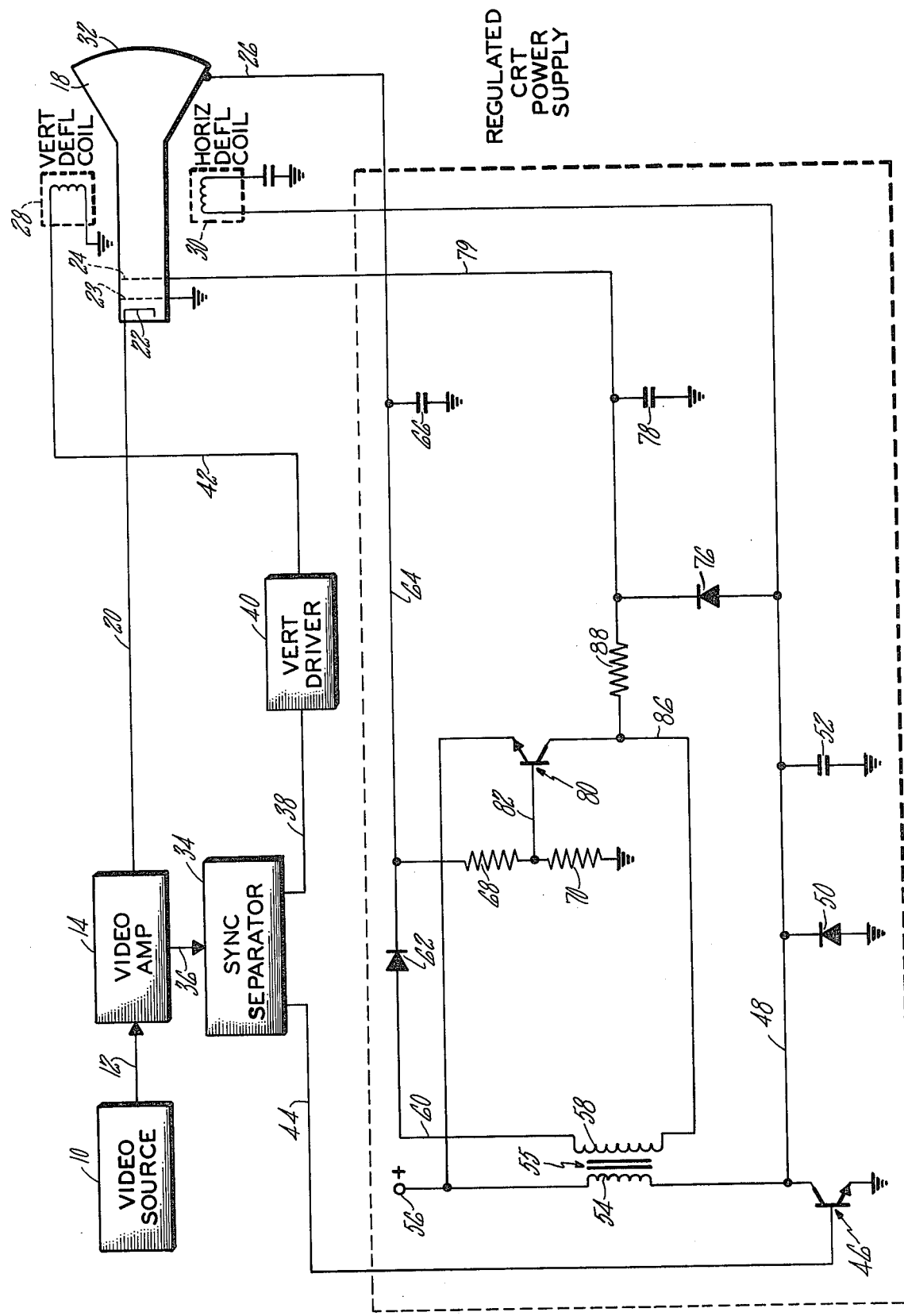

REGULATED CRT POWER SUPPLY

BACKGROUND OF THE INVENTION

1. Field of the Invention

This invention relates to a power supply circuit configuration providing improved voltage regulation for a CRT, and, more particularly, to a regulated power supply circuit configuration which provides a voltage feedback loop between the portion of a CRT power supply providing operating potential to the screen electrode and the portion of the power supply providing operating potential to the anode of the CRT.

2. Description of the Prior Art

Video display systems are well-known devices and have been used for many years as a readout device in conjunction with computer terminal equipment or other such systems where it is desirable to have a visual presentation of text or sensor information. The actual display device is often a CRT having a phosphorous coating on the faceplate across which an electron beam is swept in vertically adjacent lines to form a composite image. The electron beam is generated by a gun situated in the neck portion of the CRT, and it is modulated by an electrical signal applied to a control element which varies the beam intensity and, in turn, the light output of the phosphor coating. Proper operation of the CRT requires that the power supply providing DC operating potentials to the anode not deviate significantly. If coupled to the deflection circuitry, this potential is normally regulated so that during periods of high beam current, the load on the power supply will not pull down the effective DC voltage.

Some prior art devices for providing a relatively constant DC operating potential to the anode have involved an independent power supply which is completely separate from the horizontal deflection circuitry for the CRT. While it is possible to achieve a high degree of regulation by separating the power supply function and the horizontal deflection function, these devices are inherently costly since many component parts are required in the respective units.

Other devices for regulating DC operating potential supplied to the anode have involved the regulation of a lower voltage power supply, such as the primary side of a transformer, and just presume that the high voltage will be maintained essentially constant. Because the actuatable operating potential supplied to the anode is not sensed, these devices are inherently less accurate than a direct sensing device.

SUMMARY OF THE INVENTION

The object of the present invention is to provide a double acting circuit for regulating the DC operating potential of a high voltage power supply by the direct summation of voltages and reduced loading on an intermediate power supply.

It is another object of the present invention to provide a circuit for regulating the high voltage power supply of a CRT while utilizing to the maximum extent of existing components to improve the accuracy of the regulated voltage and, in turn, enhancing display performance.

According to yet another object of the present invention, a regulator for a power supply circuitry of a CRT is provided in which the control element of a transistor amplifier senses the variations in the operating potential of the anode power supply. The amplifier is coupled between an intermediate power supply and the higher voltage power supply for the anode to provide a controllable feedback loop which adds directly to the DC operating potential supplied to the CRT anode. At the same time the transistor amplifier unloads the intermediate voltage power supply which also causes an increase in the voltage supplied to the CRT anode.

Other objects, features and advantages of the present invention will become more apparent in the light of the following detailed description of preferred embodiments thereof, as illustrated in the accompanying drawing.

BRIEF DESCRIPTION OF THE DRAWING

The FIGURE is a schematic diagram of a preferred embodiment of the instant invention illustrated in conjunction with a conventional system employing a CRT, such as a video display system.

DESCRIPTION OF THE PREFERRED EMBODIMENT

Referring initially to the FIGURE, the regulator for a high voltage power supply of a CRT according to the instant invention will be described in conjunction with a conventional video display system. Video source 10 may be one of the many well-known devices which have an electrical output signal comprising a composite video signal suitable for display on a cathode ray tube. For example, it may be output signal from an integrated system, such as a video monitor or the like or it may be only a portion of a much more comprehensive system, such as a readout display for a computer or the like.

Video source 10 presents a composite video signal on line 12 to amplifier 14 which further amplifies the signals and in turn impresses them on a control element of cathode ray tube 18 via line 20. CRT 18 is of conventional design and includes an electron beam gun at the rear portion of the neck having a cathode 22, a grid electrode 23, at least one screen electrode 24 and, near the front end of the CRT, an anode 26. A vertical deflection coil 28 and horizontal deflection coil 30 are provided to sweep the electron beam generated by the electron beam gun vertically and horizontally across the phosphor coating disposed along the inward surface of a faceplate 32.

As indicated herebefore, in normal operation anode 26 of the electron beam gun in CRT 18 must be supplied with a high DC operating potential, typically 20 kilovolts, and screen electrode 24 must be supplied with an intermediate DC operating potential, typically 600 volts. The DC component of these operating potentials are often regulated so that they do not change significantly under normal operational current loads drawn from the respective power-supplies. In conjunction with the regulated power supply of the present invention, horizontal synchronizing signals from sync separator 34 are coupled by a line 44 to the control element of switch 46. In preferred form, switch 46 is an NPN transistor having its collector coupled to horizontal deflection coil 30 by line 48. Diode 50 and capacitor 52 are shunted between line 48 and ground. Also coupled to the collector of transistor 46 is one end of primary coil 54 of transformer 55. The opposite end of the primary coil 54 is coupled to a reference potential source 56, typically in the range of 60 volts DC. The secondary winding 58 of transformer 55 is connected in series via line 60, with diode 62 and, in turn, it is coupled by line 64 to anode 26 near the faceplate at the front of CRT 18. Capacitor 66 is shunted from line 64 to ground. Resistors 68 and 70 are connected in series and shunted to ground from line 64 providing both a bleed circuit for the high voltage DC operating potential and senses the voltage on anode 26 in a manner which will be described in greater detail hereinafter. Additionally, resistors 68 and 70 act as a bleeder to discharge the high voltage on anode 26 when the system is turned off.

In operation, horizontal sync signals are presented to line 44 and the base of switch 46. During the horizontal line scan interval, switch 46 is turned on allowing a current to flow from source 56 through primary winding 54 of transformer 55 through then closed switch 46 and then to ground thus allowing a buildup of the magnetic field in the transformer. At the end of each line scan interval, the presence of the horizontal sync pulse at the base of switch 46 turns it off allowing the collector of switch 46 to raise at a rate determined by the resonance frequency of capacitor 52 and the combined inductive elements coupled to line 48, primarily the inductance of transformer 55 and horizontal deflection coil 30. Accordingly, the energy stored in this combined inductance acts as a source generating a pulse on line 48. In addition to the pulse on line 48, a pulse of a much higher voltage emanates from transformer secondary 58 and is presented to line 60 as the result of inductive coupling in transformer 55. This pulse passes through diode 62 and charges capacitor 66 to approximately the peak pulse voltage. The high voltage DC component on line 64 is the operating potential for anode 26, and it is typically in the range of 20 kilovolts. It should be emphasized that the rectification of current pulses triggered by the horizontal pulses to provide a DC operating voltage for the CRT gun is well known to those skilled in the art.

In a similar manner, the lower voltage pulse appearing on line 48 passes through diode 76 and charges capacitor 78 to approximately the peak value of the voltage pulse, typically 600 volts DC. The intermediate DC component on line 48 is the operating potential for screen electrode 24. As will be appreciated, the actual DC component of the voltage of each voltage supply circuit depends on the LC time constant of its respective circuit.

In accordance with the instant invention, a voltage feedback path is provided between the high voltage screen electrode power supply and the anode power supply which, in essence, creates a double acting feedback path to keep the operating potential of anode 26 essentially constant. In preferred form, the circuit comprises an amplifier 80, preferably an NPN transistor, having its base connected via line 82 to the voltage divider consisting of resistors 68 and 70. The emitter of transistor 80 is connected by line 84 to reference potential 56. The collector of transistor 80 is coupled to one end of secondary coil 58 of transformer 54. A resistor 88 is connected between the collector of transistor 80 and line 86.

In operation, a normal load on the anode power supply as the result of a heavy beam current causes a reduction in the effective DC operating voltage on line 64. This is because the energy stored in capacitor 66 discharges during the line scan interval when the electron beam is swept across the face of the CRT. With the voltage on line 64 at its normal operating potential of 20 kv, transistor 80 is biased in the lower ¼ of its operating range. If the effective voltage on line 64 begins to drop this change results in a lower sensed voltage on line 82 as the result of the corresponding drop across the voltage divider 68, 70. This drop causes a more negative base to emitter voltage of transistor 80 which tends to turn the transistor off. At the same time transistor 80 is reducing conduction, its collector voltage rises toward a maximum of the operating voltage for the screen electrode or line 79 which in turn directly adds to the output voltage on line 64 through winding 58 and diode 62, and in addition decreasing the current through resistor 88. At the same time the current through a resistor 88 is decreasing, this reduction correspondingly reduces the power requirement of the intermediate power supply by reducing the magnitude of current pulses through diode 76. In turn, this reduced power drain on transformer 55 allows more voltage to be produced on the secondary winding 58, thereby raising DC component of voltage on line 64. As will be apparent, the voltage increase caused by the reduced loading on the intermediate voltage power supply adds directly to the output of secondary 58 thereby additionally increasing the final DC component of the high voltage power supply.

Therefore, amplifier 80 influences the final output to anode 28 by the combined effects of the direct addition of the voltage on line 86 through winding 58 and diode 62, and simultaneously by the change in loading on the intermediate power supply by virtue of the current variations in resistor 88 in response to the voltage on line 86.

It should be understood that in accordance with the preferred embodiment of the present invention, amplifier 80 is illustrated as a single NPN transistor which would have a high gain. However, it should also be understood that amplifier 80 could have multiple stages thereby allowing a plurality of lower gain transistors to be used.

Although the invention has been shown and described with respect to preferred embodiments thereof, it should be understood by those skilled in the art that various changes and omissions in the form and detail thereof may be made therein without departing from the spirit and the scope of the invention.

Having thus described typical embodiments of my invention, that which I claim as new and desire to secure by Letters Patent of the United States is:

1. A regulated power supply for a CRT, said CRT including an anode and at least one screen electrode, comprising:

a first voltage means having an output for providing a high voltage DC operating potential of a first voltage level to an anode of a CRT;

a second voltage means having an output for providing an intermediate DC operating potential of a second voltage level to a screen electrode of said CRT, said second voltage level being less than said first voltage level; and a circuit means coupled to both said voltage means and the output of said second voltage means for sensing deviations in the output voltage level of said first voltage means, and in response thereto said circuit means both providing a feedback from the output of said second voltage means to said first voltage means and increasing the output voltage level of said second voltage means.

2. Apparatus according to claim 1, wherein said circuit means further includes a sensing means coupled to the output of said first voltage means for sensing voltage deviations thereon, and an amplifier having its control element connected to said sensing means and having its output terminal coupled to both the output of said second voltage means and said first voltage means.

3. Apparatus according to claim 2, wherein said sensing means is a voltage divider, comprising a pair of series connected resistors, and wherein the control element of said amplifier is coupled therebetween.

4. Apparatus according to claim 2, wherein said circuit means further includes an impedance coupled between the output of said second voltage means and the output of said amplifier.

5. An apparatus according to claim 1, wherein said circuit means further comprises a voltage divider which is connected to the output of said first voltage means, a transistor having its base coupled to said voltage divider, a low voltage source of operating potential, and a transistor having its base coupled to said voltage divider, its emitter coupled to said low voltage source of operating potential, and its collector connected to said first voltage means.

6. Apparatus according to claim 5, wherein said circuit means further comprises a resistor connected between the collector of said transistor and the output of said second voltage means.

7. Apparatus according to claim 5, wherein said low voltage source provides operating potential for both said first voltage means and said second voltage means.

* * * * *